(12) United States Patent
Zhou et al.

(10) Patent No.: US 10,372,837 B2
(45) Date of Patent: *Aug. 6, 2019

(54) INTEGRATED CIRCUIT BUFFERING SOLUTIONS CONSIDERING SINK DELAYS

(71) Applicant: International Business Machines Corporation, Armonk, NY (US)

(72) Inventors: Ying Zhou, Cedar Park, TX (US); Stephen T. Quay, Austin, TX (US); Lakshmi N. Reddy, Briarcliff Manor, NY (US); Gustavo E. Tellez, Essex Junction, VT (US); Gi-Joon Nam, Chappaqua, NY (US); Jiang Hu, College Station, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/896,176

(22) Filed: Feb. 14, 2018

(65) Prior Publication Data

US 2018/0373815 A1  Dec. 27, 2018

Related U.S. Application Data

(63) Continuation of application No. 15/630,343, filed on Jun. 22, 2017.

(51) Int. Cl.
*G06F 17/50* (2006.01)

(52) U.S. Cl.
CPC ............ *G06F 17/50* (2013.01); *G06F 17/505* (2013.01); *G06F 17/5068* (2013.01); *G06F 17/5077* (2013.01)

(58) Field of Classification Search
USPC .................................................. 716/110–116
See application file for complete search history.

(56) References Cited

U.S. PATENT DOCUMENTS 6,662,349 B2  12/2003  Morgan et al.
6,996,512 B2   2/2006  Alpert et al.
(Continued)

FOREIGN PATENT DOCUMENTS

WO  2007087270 A2   8/2007
WO  2012124117 A1   9/2012
WO  2013186014 A1  12/2013

OTHER PUBLICATIONS

Chakraborty et al., "Dynamic Thermal Clock Skew Compensation Using Tunable Delay Buffers", IEEE Transactions On Very Large Scale Integration (VLSI) Systems, vol. 16, No. 6, Jun. 2008, 11 pages.

(Continued)

*Primary Examiner* — Binh C Tat
(74) *Attorney, Agent, or Firm* — Scott S. Dobson

(57) ABSTRACT

Optimizing timing in a VLSI circuit by generating a set of buffer solutions and determining a most critical delay and a sum of critical delays for each solution in the set of solutions. Quantifying a relationship between the most critical delay and the sum of critical delays for each solution. Comparing each solution's quantified relationship to the quantified relationship of each other solution in the set of solutions. Identifying, based on the comparing of each solution's relationship to the relationship of each other solution in the set of solutions, at least one solution in the set of solutions to have a worse relationship between the most critical delay and the sum of critical delays than the other solutions in the set of solutions. Pruning the at least one solution from the set of solutions.

1 Claim, 6 Drawing Sheets

(56) References Cited

U.S. PATENT DOCUMENTS

| | | | |
|---|---|---|---|
| 7,010,767 B2 | 3/2006 | Elassaad et al. | |
| 7,454,730 B1 | 11/2008 | Chowdhury | |
| 7,480,886 B2 | 1/2009 | Carney et al. | |
| 8,010,922 B2 | 8/2011 | Malgioglio et al. | |
| 8,423,940 B2* | 4/2013 | Daellenbach | G06F 17/5077 |
| | | | 716/113 |
| 8,484,592 B1 | 7/2013 | Kocan | |
| 8,839,171 B1 | 9/2014 | Varadarajan et al. | |
| 2006/0041852 A1 | 2/2006 | Drumm et al. | |
| 2007/0288875 A1 | 12/2007 | Eakins et al. | |
| 2008/0016479 A1* | 1/2008 | Alpert | G06F 17/5045 |
| | | | 716/114 |
| 2008/0072202 A1 | 3/2008 | Alpert et al. | |
| 2009/0210842 A1 | 8/2009 | Malgioglio et al. | |
| 2010/0257499 A1 | 10/2010 | Alpert et al. | |
| 2013/0227506 A1 | 8/2013 | Kocan | |
| 2014/0149956 A1 | 5/2014 | Fluhr et al. | |

OTHER PUBLICATIONS

Zhou et al., "Integrated Circuit Buffering Solutions Considering Sink Delays", U.S. Appl. 15/630,343, filed Jun. 22, 2017.
Zhou et al., "Integrated Circuit Buffering Solutions Considering Sink Delays", U.S. Appl. No. 15/848,053, filed Dec. 20, 2017.
List of IBM Patents or Patent Applications Treated as Related, dated Feb. 14, 2018, 2 pages.

* cited by examiner

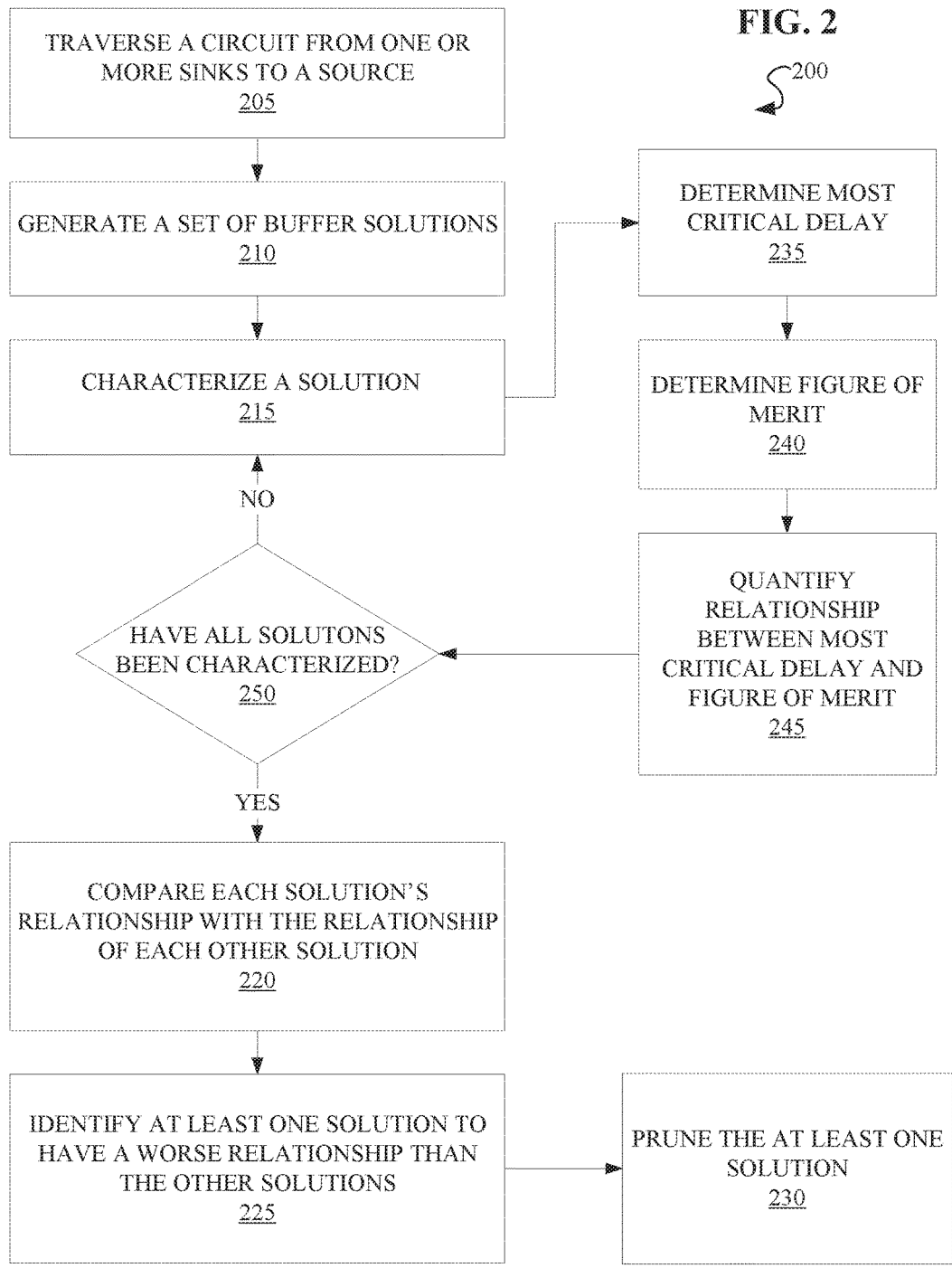

INTEGRATED CIRCUIT BUFFERING SOLUTIONS CONSIDERING SINK DELAYS

BACKGROUND

The present disclosure relates to optimizing timing in an integrated circuit, and more specifically, to determining buffer placement to optimize timing in an integrated circuit.

Operational clock frequency and timing are often key considerations in the design of high-performance integrated circuits. However, as they are not the only considerations that go into circuit design, there are inevitably instances where timing is negatively impacted by other design considerations. One such instance is related to buffering the circuit. Buffers can serve as isolators (e.g. to control data transmission) or amplifiers (for weak signals), but also act to delay the signal and may thus impede proper circuit timing.

SUMMARY

According to embodiments of the present disclosure, a method for optimizing timing in a VLSI circuit comprising is described.

The method may begin by generating a set of buffer solutions. The method may proceed by determining a most critical delay and a sum of critical delays for each solution in the set of solutions. A relationship between the most critical delay and the sum of critical delays may then be quantified for each solution.

Each solution's relationship between the most critical delay and the sum of critical delays may be compared to the relationship between the most critical delay and the sum of critical delays of each other solution in the set of solutions. Based on the comparing of each solution's relationship to the relationship of each other solution in the set of solutions, at least one solution in the set of solutions may be identified to have a worse relationship between the most critical delay and the sum of critical delays than the other solutions in the set of solutions. The at least one solution may then be pruned from the set of solutions.

A computing system and computer program product can embody the method and structures of the disclosure. The computing system can comprise a network, a memory configured to store buffer solutions and solution characteristics, and a processor in communication with the memory. The computing system can be configured to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2 depicts a method for optimizing timing in a VLSI circuit, according to embodiments of the present disclosure.

Figure 1A:
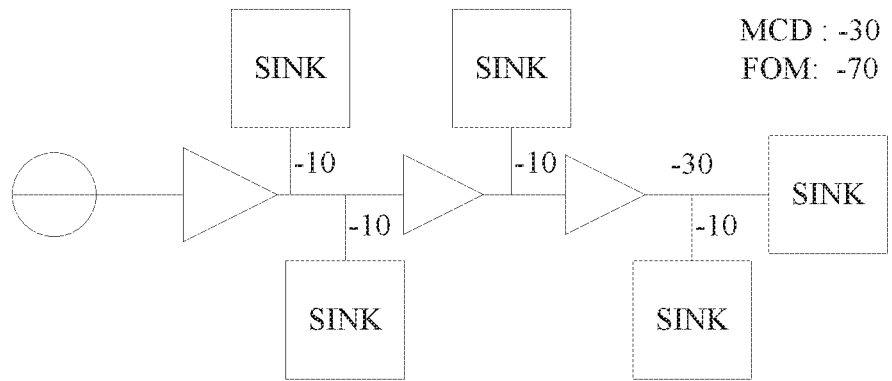
FIGS. 1A and 1B depicts an illustration of how consideration of all sink negative slacks may impact buffer solution selection.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to optimizing timing in a very large scale integrated circuit (VLSI circuit), and more particular aspects relate to methods and systems for determining an optimal buffer solution for a VLSI circuit. While the present disclosure is not necessarily limited to such applications, various aspects of the disclosure may be appreciated through a discussion of various examples using this context.

VLSI circuits, and integrated circuits in general, are often designed by large teams of engineers and aided by highly specialized computers and computer programs. Due to the complex interrelations among an integrated circuit's many parts, computer assistance plays a fundamental and necessary role in their design. Improvement of these computerized tools may be continuously necessary to move the design of integrated circuits further forward.

Figure 1B:
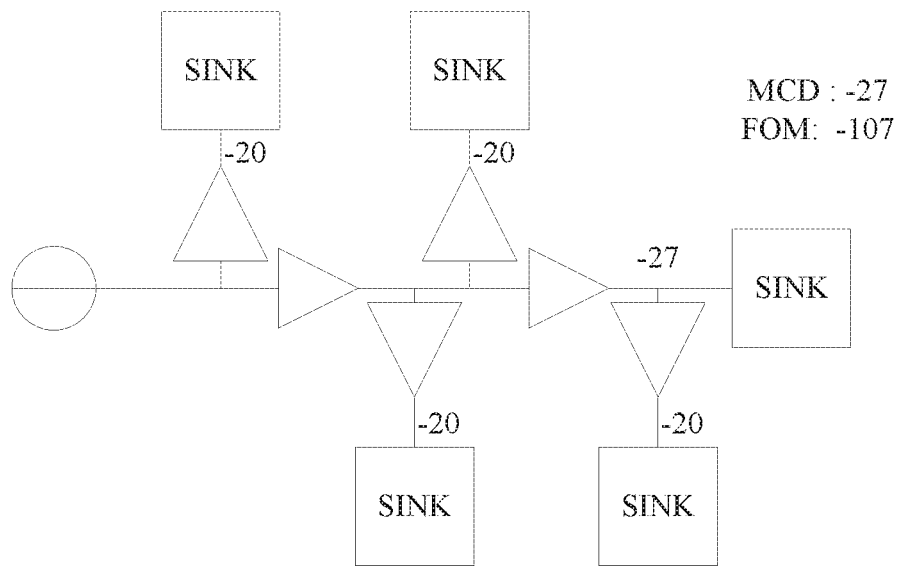

Circuit timing is a major consideration in the design of high-performance integrated circuits, such as VLSI circuits. Buffers may be necessitated by other design considerations of the circuit, and may in some configurations cause signal delays beyond the circuit's tolerances. As such, buffering solutions for integrated circuits are generally concerned with limiting the slack at a particular node with the worst slack (the most critical delay) in the circuit. While in some cases this may be a sufficient consideration to identify a satisfactory solution with respect to timing concerns, focusing on the most critical delay (MCD) without consideration of the other negative slacks in the circuit can often result in driving up the total negative slack in the circuit. Referring now to FIGS. 1A and 1B, an example is presented of the negative impacts on buffer placement that may result from only considering a circuit's worst slack.

FIG. 1A depicts an example circuit with a simple buffer solution resulting in a MCD of −30 and a total negative slack, or figure of merit (FOM), of −70. FIG. 1B depicts the same example circuit with the buffer solution modified to reduce the worst slack from −30 to −27. However, as a result, the FOM of the circuit increased from −70 to −107. This is a disproportionate cost for the marginal improvement in the worst slack, and likely would not result in overall improved performance from the solution in FIG. 1A.

Although it is relatively simple to demonstrate that there is in fact a relationship between the MCD and the FOM of a circuit, understanding the relationship fully enough to manipulate it for optimizing the circuit design is more complex. The present disclosure describes a method and system for optimizing the timing in a circuit by accounting for the circuit's FOM when assessing buffering solutions. By considering the impact of a buffering solution on the circuit's total negative slack, and not only the node with the single worst slack, more optimal buffering solutions may be identified.

Referring now to FIG. 2, a method 200 for optimizing timing in a VLSI circuit is described, according to embodiments of the present disclosure. The method 200 may in some instances be referred to as a "bottom up" method of pruning buffer solutions.

The method 200 may begin by traversing the circuit from any sinks in the circuit to the source, as in operation 205. Traversing the circuit may generally refer to timing analysis of a signal as it travels through the circuit. Traversal of the circuit may generally involve identifying the arrival time of the signal for each sink in the circuit, and determining any associated slack. In embodiments, slack may be determined for each node of the circuit. Slack may generally be calculated as the difference between a node's required time and the measured arrival time. In embodiments, operation 205 may involve static timing analysis, dynamic timing analysis, circuit simulation, gate level simulation, etc.

At operation 210, a set of buffer solutions may be generated based on the traversal. A set of solutions may generally include any number of different buffer arrangements possible for a particular circuit.

At operation 215, a solution may be characterized. The characterization may vary among embodiments, according to circuit design parameters and desired evaluation criteria. In embodiments, the characterization may involve associating a slack value to each node in a circuit. In embodiments, characterizing the solution may involve determining other slack characteristics, such as a solution's load cap (the circuit's maximum load, e.g. current), buffer cost (buffer capacitance is related to power consumption, e.g. wire length and buffer area), etc.

In embodiments, the characterization may allow for a determination of the worst slack or the most critical delay (MCD), or the node or path with the single largest negative slack in the circuit for a given solution, as in operation 235. The MCD may be identified by calculating the delay at each node, where the slack for a given node ($SLACK_n$) is found by subtracting the delay between the sink and the node ($DELAY_{n,s}$) from the required arrival time for the sink ($RAT_s$):

$$SLACK_n = RAT_s - DELAY_{n,s}$$

Since slack may encompass any arrival time that deviates from the required time, whether late or early, this calculation provides that late signals will result in negative values. In embodiments, negative slacks may be defined by setting a slack threshold t:

$$SLACK_n' = \max(t - SLACK_n, 0)$$

so that all positive slack values are treated as zero and do not contribute to the calculation. Once identified, these negative slacks, or critical delays, may be sorted by value. Once sorted, the delay with the greatest value (i.e. the MCD) may be identified.

In embodiments, the characterization may allow a determination of the total critical delay in the circuit, or the FOM, as in operation 240. The FOM may generally be calculated by taking the sum of all critical delays, or negative slacks, in the circuit. In some embodiments, this may be found by calculating the slack for each node and dismissing those slacks above a certain threshold (e.g., zero). The remaining (in this example, negative) slacks may then be summed to yield the FOM for the circuit.

In embodiments, the method may proceed to quantifying a relationship between the most critical delay and the sum of critical delays, as in operation 245. Though solutions may be assessed using the raw values for the MCD and the FOM for each solution, by quantifying a relationship between the two, the tradeoff between these two possible merits of a solution may be better understood and more optimum solutions found. The relationship between the MCD and the FOM (referred to herein as "the relationship") may generally be found by treating the traversal of the circuit as a vector value and taking the p-norm of the circuit's FOM.

If the traversal of the circuit is treated as a vector x, and the slacks of the nodes are filtered so that each of $x_1$, $x_2, \ldots, x_n$ is the negative slack of a node n, then:

$$x = (x_1, x_2, \ldots, x_n)$$

where x is the FOM. The p-norm of x may then be found as:

$$\|x\|p = (\Sigma^n i=1 |x_i|^p)^{1/p}$$

where if p=1 then the p-norm of the FOM, or the PFOM, yields:

$$\|x\|1 = \Sigma^n i=1 |x_i|$$

which, similar to FOM, is a sum of the considered slacks. Conversely, if p=∞, then the PFOM yields:

$$\|x\|\infty = \max(|x_1|, |x_2|, \ldots, |x_n|)$$

which, similar to the MCD, is the largest single value contributing to the vector. Thus, by varying p between 1 and ∞, the PFOM allows for the relationship between the MCD and the FOM to be numerically evaluated. This allows for easier visualization and balancing of the two metrics, and thus selection of more optimal solutions. Slack values used to calculate the PFOM may generally be calculated from the source:

$$SLACK_{sink} = RAT_{sink} - DELAY_{node,sink} - DELAY_{source,node}$$

rather than per node as they may be when calculating slack for determining the MCD.

After quantifying the relationship for a given solution, a review may be executed to ensure that each solution has been fully characterized, as in decision block 250. If each solution has not yet been characterized, then the method may return to operation 215 and characterize another solution. If each solution in the set of solutions has been characterized, then the method may proceed to operation 220.

In operation 220, the relationship between the MCD and the FOM for each solution is compared to the relationship between the MCD and the FOM for each of the other solutions in the set of solutions. In some embodiments, the comparing may be carried out by ranking solutions by value. The value used to determine ranking may vary among embodiments.

In operation 225, at least one solution in the set of solutions is identified to have a worse relationship between the most critical delay and the sum of critical delays than the other solutions in the set of solutions, as a result of the comparing. What constitutes a "worse" relationship may generally be defined per circuit, based on the circuit's design parameters. In embodiments, what constitutes a worse relationship may be determined by a user. In embodiments, a worse relationship may be identified if the value of a solution's relationship deviates from a set of design parameters by a greater margin than the value of another solution's relationship. In embodiments, what constitutes a worse relationship may be calculated based on the range of PFOM values derived. In embodiments, a worse relationship may generally be a higher PFOM value, i.e. those PFOM values representing a more pronounced tradeoff between the MCD and FOM.

In embodiments, the comparison of operation 220 and identifying of operation 225 may consider more than the relationship between the MCD and the FOM. In some embodiments, the raw value of the MCD or the FOM may be considered. In some embodiments, both the raw score MCD and FOM may be considered. In some embodiments, each solution may be further characterized by other factors, e.g. a buffer cost and/or a load cap. In such embodiments, solutions could be identified to have a worse total characterization, or a worse partial characterization, based on a comparison of each factor considered.

In operation 230, the at least one solution identified in operation 225 is pruned (i.e., removed from consideration) from the set of solutions. In embodiments, solutions may be pruned from the set of solutions until a target number of solutions remains. In embodiments, the target number of solutions remaining may be a single solution. In embodiments, the size of the target number of solutions may be predetermined by a set of design parameters. In embodiments, the size of the target set of solutions may be determined as a result of the comparing of each solution's relationship to the relationship of each other solution in the starting set of solutions.

In embodiments considering multiple factors, solutions may not be pruned unless each of the factors compared and considered is found to be worse than each of the factors of at least one other solution in the set of solutions. For example, in an embodiment where each solution is characterized by a load cap and a buffer cost in addition to the relationship between the MCD and the FOM, a solution may be pruned only if each of its load cap, buffer cost, and relationship is found to be worse than each of the load cap, buffer cost, and relationship of another solution in the set of solutions. Generally, a lower load cap and a higher buffer cost would be considered to be worse characteristics, so, in this example, a solution would be pruned only if it has a lower load cap than another solution, a higher buffer cost than the same other solution, and a worse relationship between the MCD and the FOM than the same other solution.

In embodiments, the remaining solutions may be displayed on a user interface. Following pruning, a user may further prune solutions from the target number of remaining solutions. Following pruning, the remaining solutions may be further evaluated, for example, by repeated execution of operation 220, and being comparatively analyzed against one another. In some embodiments, solutions may be submitted as part of a circuit design for fabrication, following pruning. In embodiments, pruning and operation 225 may be foregone and a best PFOM solution selected without first pruning worse solutions from the set of solutions. In embodiments where pruning is foregone, runtime overhead of method 200 may be reduced, but less improvement in FOM may also occur.

Figure 3:
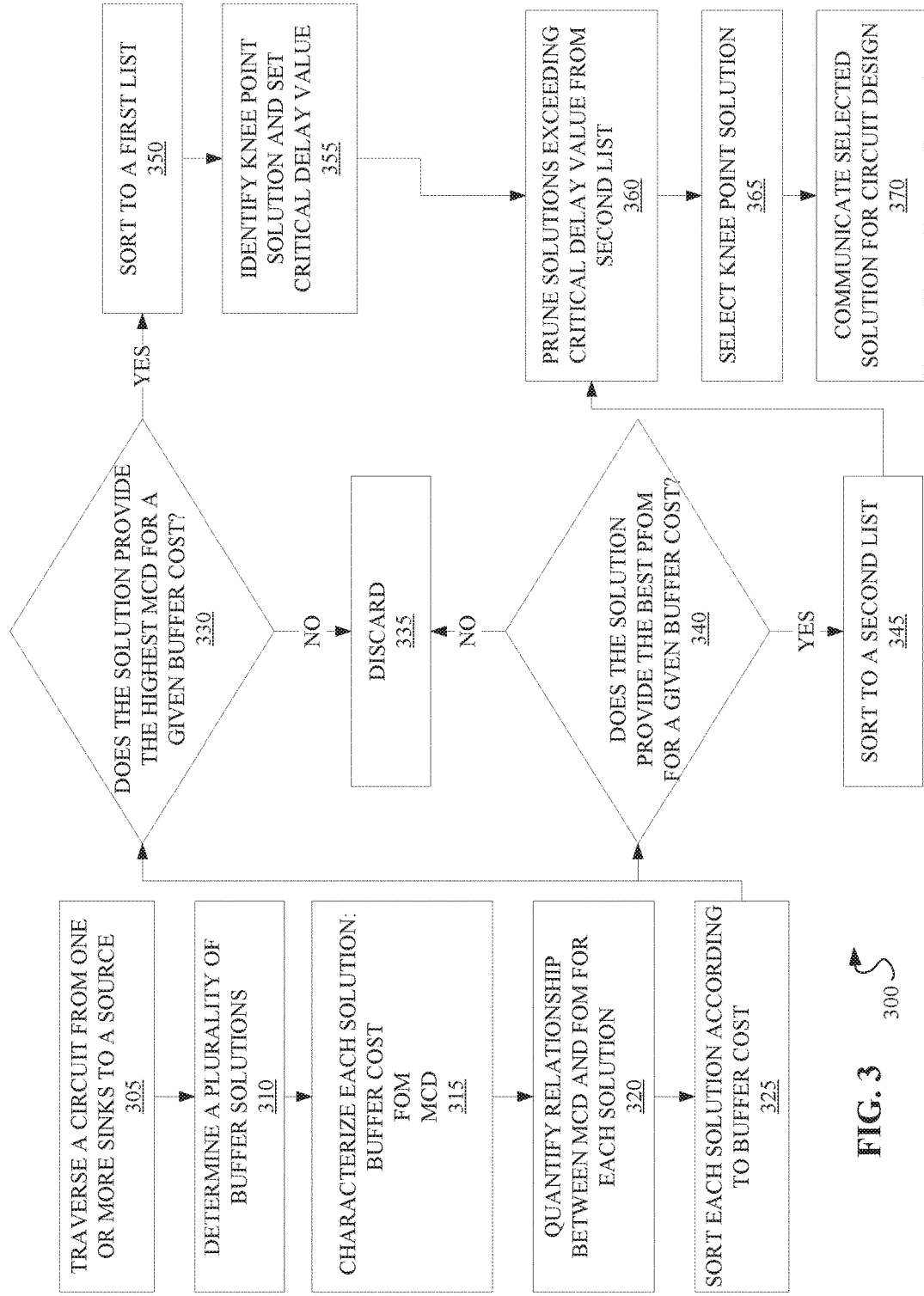
FIG. 3 depicts another method for optimizing timing in a VLSI circuit, according to embodiments of the present disclosure.

Referring now to FIG. 3, a method 300 for optimizing timing in a VLSI circuit is described, according to embodiments of the present disclosure. The method 300 may in some instances be referred to as an "at source" method of pruning solutions.

The method 300 may begin by traversing the circuit from any sinks to the source, as in operation 305. Traversing the circuit may generally refer to timing a signal as it travels through the circuit. Signals arriving before or after a required time may be said to have "slack," with negative slack encompassing any signal arriving late.

At operation 310, a set of buffer solutions may be generated based on the traversal. A set of solutions may generally include any number of different buffer arrangements possible for a particular circuit.

At operation 315, each solution in the generated set of solutions is characterized. In embodiments, solutions may be characterized with each of a buffer cost, an MCD, and an FOM.

At operation 320, the relationship between the MCD and the FOM is quantified for each solution to yield a PFOM. In some embodiments, it may be advantageous to adjust the definition of PFOM for the at source method:

$$PFOM = MCD + FOM/p$$

This may provide a PFOM more consistent with the greater weight the at-source method gives to the MCD, as compared with the bottom-up method.

In operation 325, each solution is sorted according to buffer cost. In embodiments, solutions with buffer costs exceeding permissible design parameters may be discarded at this operation as well.

At decision block 330, each set of solutions for a given buffer cost are assessed to determine the best MCD, i.e. the highest (or least negative) MCD, that is achievable for a given buffer cost. Solutions found to have the highest MCD for a given buffer cost are sorted to a first list, as in operation 350. In embodiments, multiple solutions in a set may have the same best MCD for a given buffer cost. In embodiments, the first list may comprise solutions with the best MCD for a range of buffer costs.

Once the first list is populated, the knee point value of the solutions in the first list may be identified and the associated MCD value set as the critical delay cap, as in operation 355. In embodiments, the knee point may be found by plotting the solutions from the first list, for example, according to MCD and buffer cost. The knee point may be identified as a point of inflection on the plot of the first list. In embodiments, the knee point may encompass several solutions with a narrow range of MCD values. The MCD value, or small range of values, identified at the knee point may be set at the critical delay cap. In embodiments, the critical delay cap may represent the best achievable MCD for a set of solutions for a given set of design parameters. The critical delay cap may be used to determine a threshold for pruning solutions from the set of solutions, and may be used in conjunction with the PFOM values of the solutions in the set of solutions.

If, at decision block 330, a solution is found to not have a best MCD for its buffer cost, the solution may be discarded, as in operation 335.

At decision block 340, each set of solutions for a given buffer cost are assessed to determine the best PFOM achievable for a given buffer cost. In embodiments, the best PFOM may be determined according to design parameters associated with the circuit traversed in operation 305. In embodiments, the best PFOM may be determined according to a range of values input by a user, or determined by a system according to the range PFOM values calculated in operation 320.

Solutions found to have the best PFOM for a given buffer cost are sorted to a second list, as in operation 345. In embodiments, multiple solutions in a set may have the same best PFOM value for a given buffer cost. In embodiments, the second list may comprise solutions with the best PFOM for a range of buffer costs. Similar to the first list, the second list may, in embodiments, have a knee point PFOM value or range of values, found at an inflection point of the solutions when plotted against buffer cost and PFOM value. In embodiments, a solution may have a worse characterization if the solution's relationship between the most critical delay and the sum of critical delays comprises a higher value than a relationship between the most critical delay and the sum of delays of at least one other solution of the set of solutions.

In embodiments, decision block 340 may be executed in parallel with decision block 330. In embodiments, decision blocks 330 and 340 may be executed in sequence. Both decision block 330 and 340 may be executed with the full set of solutions generated in operation 310 and sorted in 325. In embodiments where decision blocks 330 and 340 are executed in sequence, either decision block 330 or 340 may be used to pare down the solution set. For example, if decision block 340 is executed subsequent to decision block 330, decision block 340 may be executed with a set of solutions which does not contain those solution discarded in the process of executing decision block 330.

If, at decision block 340, a solution is found to not have a best PFOM for its buffer cost, the solution may be discarded, as in operation 335.

At operation 360, the second list may be pruned using the threshold set with the critical delay cap from operation 355, resulting in a "reduced second list." Pruning the second list may involve discarding any solution with an MCD value exceeding the critical delay cap by a particular margin. In embodiments, the margin may be predetermined according to a set of design parameters, or calculated based on the range of MCD values determined at operation 315 or the range of MCD values present in the second list. In embodiments, the threshold may be an upper threshold, or a range representing an upper and a lower threshold. In embodiments with both an upper and a lower threshold, the range delineated by the threshold may be determined according to a set of design parameters, as well as the critical delay cap.

Following pruning, the reduced second list may be replotted and the knee point adjusted as appropriate to accommodate the reduction in the list values. In embodiments where the knee point of the second list represents a range, adjusting the knee point may involve narrowing the range.

At operation 365, a solution, or target set of solutions, may be selected from the adjusted knee point of the second list. In embodiments, a set of final solutions may be selected from close proximity to the knee point. Close proximity to the knee point may be determined according to a set of design parameters associated with the circuit traversed in operation 305. The size of the set of final solutions may also be determined according to the set of design parameters. In embodiments, pruning, and operation 360, may be foregone and a best PFOM solution selected without first pruning worse solutions from the set of solutions. In embodiments wherein pruning is foregone, runtime overhead of method 300 may be reduced, but less improvement in FOM may also be expected.

At operation 370, one or more of the solutions selected at operation 365 may be communicated for circuit design and/or fabrication. In embodiments, the selected solutions may be displayed on a user interface.

Figure 4:
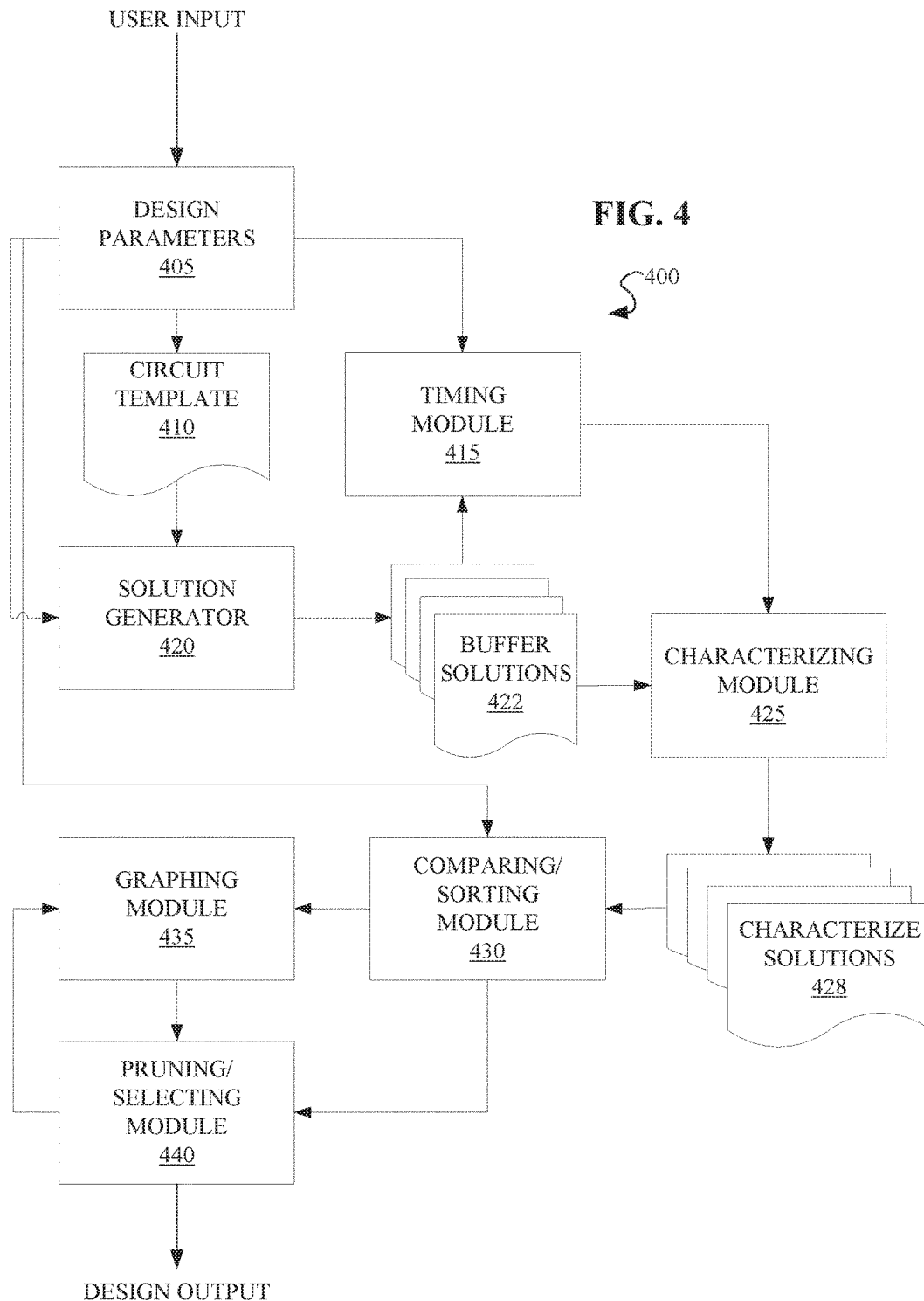
FIG. 4 depicts a simple example of a system for executing the methods described herein, according to embodiments of the present disclosure.

Methods 200, 300 described above may be executed by a system. Referring now to FIG. 4, a simple example of a system 400 for executing methods 200, 300 is depicted, according to embodiments of the present disclosure. In embodiments, system 400 may comprises a portion of an electronic design automation system (ECAD system).

Operation of system 400 may utilize design parameters 405, which may be set by user input or determined by an external system (e.g. another portion of an ECAD system). Design parameters 405 may comprise parameters for digital or analog IC design. In embodiments, system 400 may be particularly for digital design, with a particular focus on routing clock and timing signals efficiently. Design parameters 405 may include functional and logical design determinations for the desired resulting circuit design.

A circuit template 410, or multiple circuit templates 410, may be generated according to design parameters 405. In embodiments, generation of the circuit template may be integral to system 400, as in this example, or executed by an external system and the circuit template 410 input independently or with design parameters 405.

A solution generator 420 may receive input from the circuit template 410 and design parameters 405 for the generation of a number of buffer solutions 422. In embodiments, generation of buffer solutions 422 may be integrated into system 400, as in this example, or executed by an external system and the buffer solutions 422 input to system 400.

Buffer solutions 422 may be assessed by a timing module 415 (e.g. static timing analysis) according to input from design parameters 405. Assessment by timing module 415 may include slack determination for each of buffer solutions 422.

Characterizing module 425 may receive input from buffer solutions 422 and timing module 415 and assign characteristics to buffer solutions 422 accordingly. Characterizing module 425 may assign each buffer solution 422 an associated load cap, buffer cost, MCD, and FOM. Characteristics may be assigned to buffer solutions 422 individually or in groups, according to the desired design parameters 405. In embodiments, any combination of characteristic may be determined for buffer solutions 422. Characterizing module 425 may also be responsible to quantifying the relationship between the MCD and FOM for each solution 422. Once buffer solutions 422 are characterized, characterized solutions 428 may be output by characterizing module 425.

Characterized solutions 428 may then be compared to one another by comparing/sorting module 430 and sorted appropriately. Characterized solutions 428 may generally be ranked by comparing/sorting module 430 to assist in identifying best and worst solutions according to design parameters 405. Comparing/sorting module 430 may generally output to a pruning/selecting module 440. In embodiments carrying out an at-source method, such as method 300, the comparing/sorting module 430 may also output to a graphing module 435.

Graphing module 435 may receive sorted solutions from comparing/sorting module 430 and may plot them to identify a knee point, as for an at-source method (e.g. method 300). Graphing module 435 may also receive a pruned set of sorted solutions from pruning/selecting module 440, to plot and identify the knee point. In embodiments, graphing module 435 may also act to adjust the knee point on a set of solutions that has been previously graphed, but pruned since it was last graphed.

Pruning/selecting module 440 may receive output from comparing/sorting module 430 and, in embodiments, from graphing module 435. Pruning/selecting module 440 may prune and/or discard solutions identified as poor, or worse, by comparing/sorting module 430 and/or graphing module 435. In embodiments, pruning/selecting module 440 may select solutions identified as options for a given set of design parameters 405 by comparing/sorting module 430 or graphing module 435. Solutions selected by the pruning/selecting module 440 may comprise the design output of system 400. In embodiments, the design output of system 400 may be further processed to yield a physical circuit design.

Figure 5:
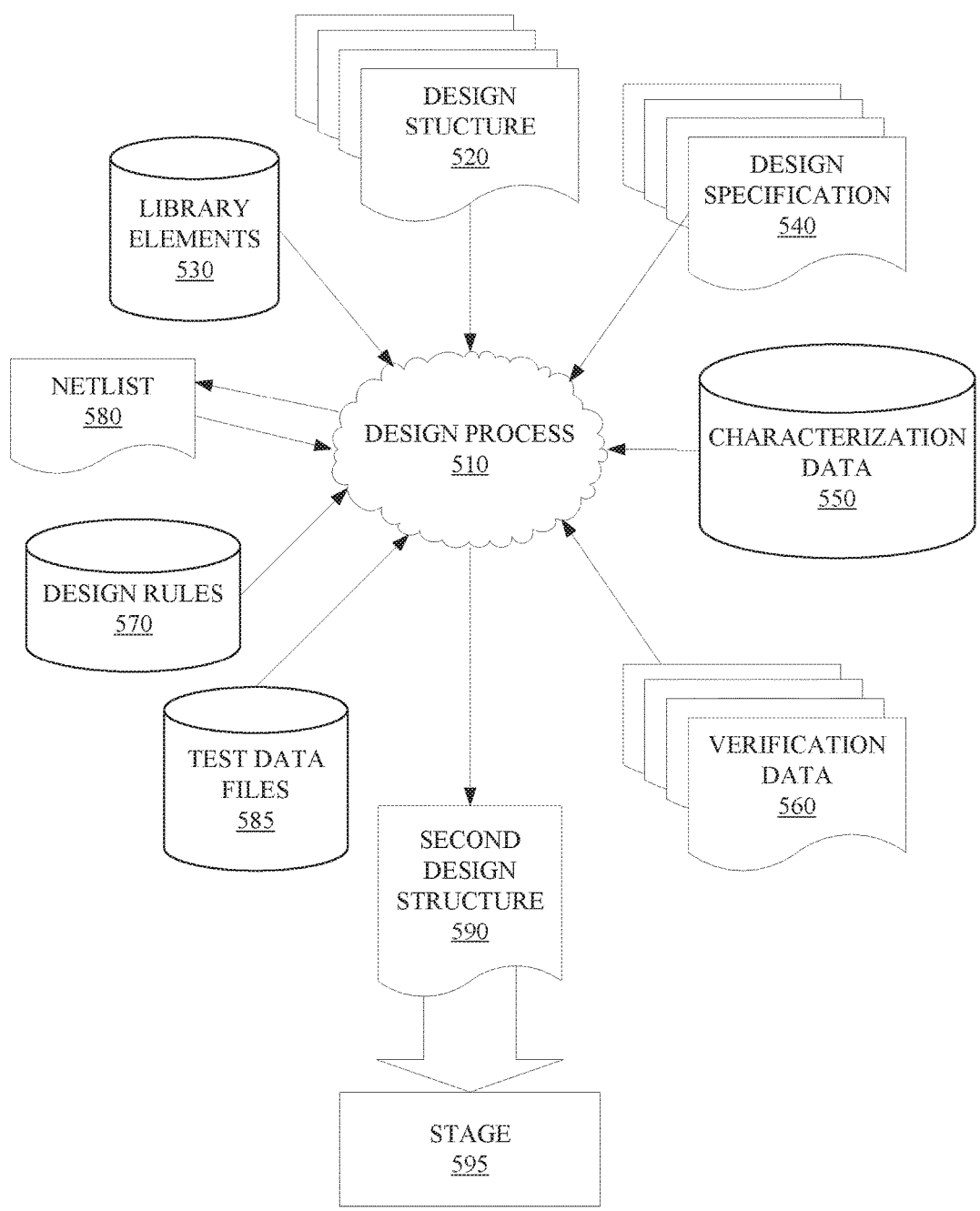
FIG. 5 depicts a block diagram of an exemplary design flow used, for example, in semiconductor IC logic design, simulation, test, layout, and manufacture.

FIG. 5 shows a block diagram of an exemplary design flow 500 used for example, in semiconductor IC logic design, simulation, test, layout, and manufacture. Design flow 500 includes processes, machines and/or mechanisms for processing design structures or devices to generate logically or otherwise functionally equivalent representations of the design structures and/or devices described above and output by methods 200, 300. The design structures processed and/or generated by design flow 500 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 500 may vary depending on the type of representation being designed. For example, a design flow 500 for building an application specific IC (ASIC) may differ from a design flow 500 for designing a standard component or from a design flow 500 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 520 that is preferably processed by a design process 510. Design structure 520 may be a logical simulation design structure generated and processed by design process 510 to produce a logically equivalent functional representation of a hardware device. Design structure 520 may also or alternatively comprise data and/or program instructions that when processed by design process 510, generate a functional representation of the physical structure of a hardware device. Whether representing functional and/or structural design features, design structure 520 may be generated using electronic computer-aided design (ECAD) such as implemented by a core developer/designer. When encoded on a machine-readable data transmission, gate array, or storage medium, design structure 520 may be accessed and processed by one or more hardware and/or software modules within design process 510 to simulate or otherwise functionally represent an electronic component, circuit, electronic or logic module, apparatus, device, or system. As such, design structure 520 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 510 preferably employs and incorporates hardware and/or software modules for synthesizing, translating, or otherwise processing a design/simulation functional equivalent of the components, circuits, devices, or logic structures output by methods 200, 300 to generate a Netlist 580 which may contain design structures such as design structure 520. Netlist 580 may comprise, for example, compiled or otherwise processed data structures representing a list of wires, discrete components, logic gates, control circuits, I/O devices, models, etc. that describes the connections to other elements and circuits in an integrated circuit design. Netlist 580 may be synthesized using an iterative process in which netlist 580 is resynthesized one or more times depending on design specifications and parameters for the device. As with other design structure types described herein, netlist 580 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 510 may include hardware and software modules for processing a variety of input data structure types including Netlist 580. Such data structure types may reside, for example, within library elements 530 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 540, characterization data 550, verification data 560, design rules 570, and test data files 585 which may include input test patterns, output test results, and other testing information. Design process 510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 510 without deviating from the scope and spirit of the invention. Design process 510 may also include modules for performing standard circuit design processes such as timing analysis, verification, design rule checking, place and route operations, etc.

Design process 510 employs and incorporates logic and physical design tools such as HDL compilers and simulation model build tools to process design structure 520 together with some or all of the depicted supporting data structures along with any additional mechanical design or data (if applicable), to generate a second design structure 590. Design structure 590 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 520, design structure 590 preferably comprises one or more files, data structures, or other computer-encoded data or instructions that reside on transmission or data storage media and that when processed by an ECAD system generate a logically or otherwise functionally equivalent form of one or more of the designs output by methods 200, 300 above. In one embodiment, design structure 590 may comprise a compiled, executable HDL simulation model that functionally simulates the devices that designs output by method 200, 300 may yield.

Design structure 590 may also employ a data format used for the exchange of layout data of integrated circuits and/or symbolic data format (e.g. information stored in a GDSII (GDS2), GL1, OASIS, map files, or any other suitable format for storing such design data structures). Design structure 590 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above. Design structure 590 may then proceed to a stage 595 where, for example, design structure 590: proceeds to tape-out, is released to manufacturing, is released to a mask house, is sent to another design house, is sent back to the customer, etc.

Figure 6:
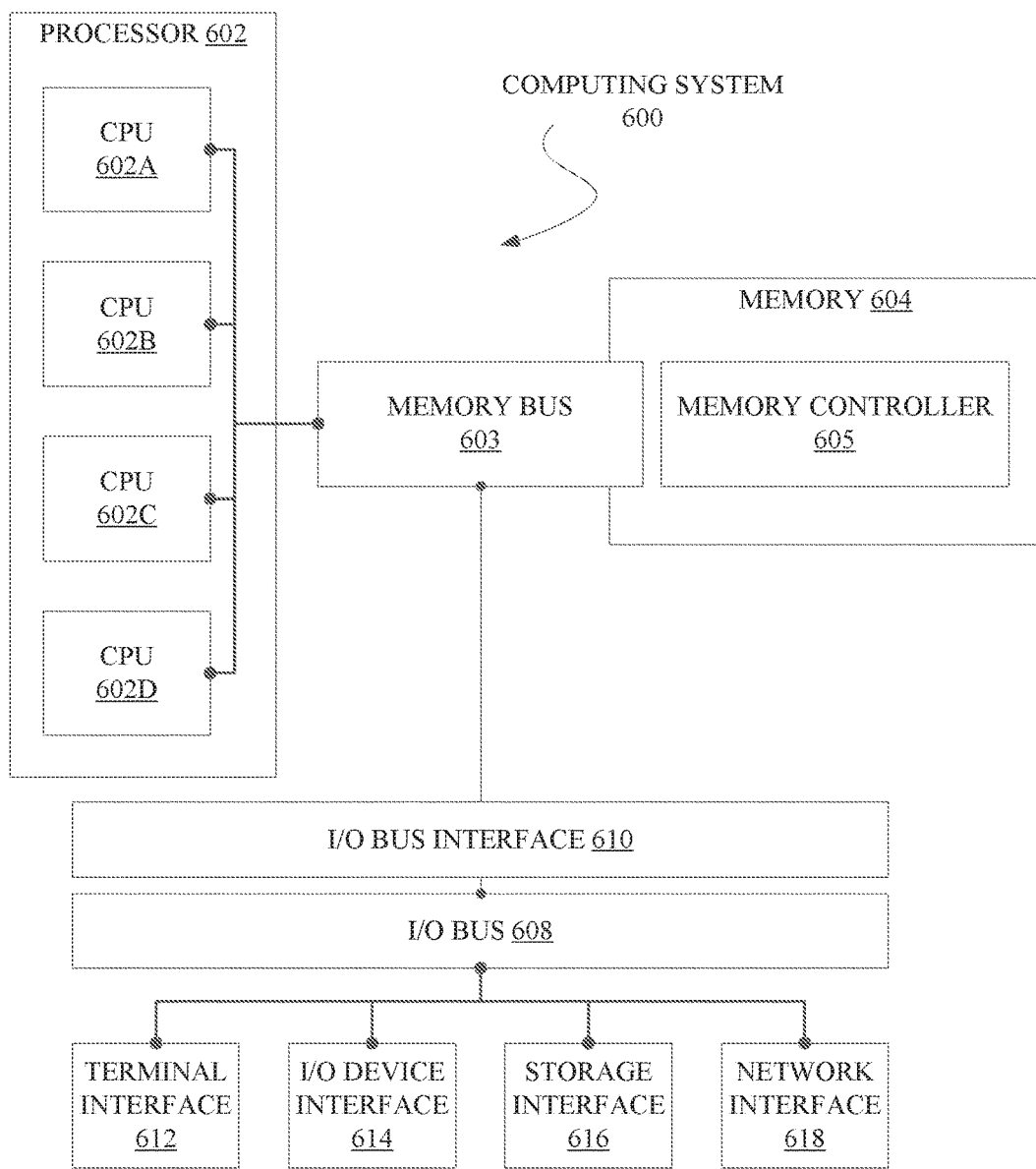
FIG. 6 is a high-level block diagram of an example computer system that may be used in implementing one or more of the methods described herein, in accordance with embodiments of the present disclosure.

Referring now to FIG. 6, shown is a high-level block diagram of an example computer system (i.e., computer) 600 that may be used in implementing one or more of the methods or modules, and any related functions or operations, described herein (e.g., using one or more processor circuits or computer processors of the computer), in accordance with embodiments of the present disclosure. In some embodiments, the major components of the computer system 600 may comprise one or more CPUs 602, a memory subsystem 604, a terminal interface 612, an I/O (Input/Output) device interface 614, a storage interface 616, and a network interface 618, all of which may be communicatively coupled, directly or indirectly, for inter-component communication via a memory bus 603, an I/O bus 608, and an I/O bus interface unit 610.

The computer system 600 may contain one or more general-purpose programmable central processing units (CPUs) 602A, 602B, 602C, and 602D, herein generically referred to as the CPU 602. In some embodiments, the computer system 600 may contain multiple processors typical of a relatively large system; however, in other embodiments the computer system 600 may alternatively be a single CPU system. Each CPU 602 may execute instructions stored in the memory subsystem 604 and may comprise one or more levels of on-board cache.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 600, and may also include the virtual memory of other computer systems coupled to the computer system 600 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the CPU 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 600 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface, but receives requests from other computer systems (clients). Further, in some embodiments, the computer system 600 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for optimizing timing in a very large scale integrated (VLSI) circuit comprising:

traversing a VLSI circuit, the circuit comprising a source, at least one sink, and one or more nodes, each node having a required time and an arrival time, wherein a difference between a node's required time and the node's arrival time is the node's slack, wherein a negative slack value is a delay;

generating, according to the traversing, a set of buffer solutions for the VLSI circuit;

determining a load cap, a buffer cost, a most critical delay, and a sum of delays for each solution in the set of solutions, the most critical delay for each solution found by calculating the delay at each node and identifying the node with the largest delay, the sum of delays for a solution found by taking a measurement, from the sink to the source, of each delay in the solution;

quantifying, for each solution, a relationship between the most critical delay and the sum of delays by calculating a p-norm of the sum of delays;

characterizing each solution according to the solution's load cap, buffer cost, and relationship;

comparing each solution's characterization to the characterization of each other solution in the set of solutions;

identifying, based on the comparing, at least one solution in the set of solutions to have a worse characterization than the other solutions in the set of solutions, wherein a solution has a worse characterization if the solution has:

- a load cap with a lower value than at least one other solution of the set of solutions;
- a buffer cost with a higher value that at least one other solution of the set of solutions; and
- a p-norm of the sum of delays that has a higher value than a p-norm of the sum of delays of at least one other solution of the set of solutions;

pruning the at least one solution from the set of solutions;

iteratively performing the steps of comparing solution's characterizations, identifying at least one solution with a worst characterization, and pruning the at least one solution until a target number of solutions remains; the target number of solutions determined according to a set of design parameters;

submitting at least one remaining solution to an integrated circuit design process;

displaying the at least one submitted solution on a user interface.

* * * * *